US008122714B2

(12) United States Patent
Yatabe

(10) Patent No.: US 8,122,714 B2
(45) Date of Patent: Feb. 28, 2012

(54) VARIABLE HYDRAULIC MOTOR DRIVING DEVICE

(75) Inventor: Michiaki Yatabe, Gifu (JP)

(73) Assignee: Nabtesco Corporation, Tokyo (JP)

( * ) Notice: Subject to any disclaimer, the term of this patent is extended or adjusted under 35 U.S.C. 154(b) by 695 days.

(21) Appl. No.: 12/298,092

(22) PCT Filed: May 1, 2007

(86) PCT No.: PCT/JP2007/059289
§ 371 (c)(1),
(2), (4) Date: Oct. 22, 2008

(87) PCT Pub. No.: WO2007/132670
PCT Pub. Date: Nov. 22, 2007

(65) Prior Publication Data
US 2009/0094976 A1    Apr. 16, 2009

(30) Foreign Application Priority Data

May 11, 2006    (JP) ................................. 2006-132212

(51) Int. Cl.
*F15B 11/02* (2006.01)
*E02F 9/22* (2006.01)
(52) U.S. Cl. ............................... 60/489; 60/443; 91/447
(58) Field of Classification Search .................... 60/441, 60/443, 489; 91/447
See application file for complete search history.

(56) References Cited

U.S. PATENT DOCUMENTS

| 5,531,071 A * | 7/1996 | Asano ............................. 60/441 |
| 6,389,809 B1 * | 5/2002 | Niidome et al. ................ 60/443 |
| 6,698,196 B2 * | 3/2004 | Hashimoto et al. ............ 60/443 |

FOREIGN PATENT DOCUMENTS

| JP | 59-65603 A | 4/1984 |
| JP | 63-235135 A | 9/1988 |
| JP | 63-235702 A | 9/1988 |
| JP | 3-69360 U | 7/1991 |
| JP | 6-65603 U | 9/1994 |
| JP | 6-67904 U | 9/1994 |

OTHER PUBLICATIONS

English translation of the PCT International Preliminary Report on Patentability and the Written Opinion of the International Searching Authority for PCT/JP2007/059289, issued Dec. 10, 2008, 6 pages.
International Search Report issued in PCT/JP2007/059289, mailed on Jun. 26, 2007, with translation, 4 pages.

* cited by examiner

*Primary Examiner* — Thomas E Lazo
(74) *Attorney, Agent, or Firm* — Osha • Liang LLP

(57) ABSTRACT

A hydraulic motor 11 is switched to a high-speed mode when pressure oil is supplied to a pressure chamber 23 of a tilt piston 17 based on the transmission of a speed signal to a high-low speed switching valve 18, and the hydraulic motor 11 is switched to a low-speed mode when pressure oil is discharged from the pressure chamber 23 of the tilt piston 17. A first braking purpose speed changing mechanism 13 operates so as to discharge pressure oil from the pressure chamber 23 of the tilt piston 17 when the pressure of pressure oil between a counterbalance valve 15 and a direction changeover valve 103 becomes equal to a tank pressure. Therefore, it is possible to provide a variable hydraulic motor driving device which is capable of preventing braking operation from being excessively long and also capable of preventing a large shock from occurring at a time of stoppage due to a large braking force generated from an early stage of braking operation.

6 Claims, 5 Drawing Sheets

VARIABLE HYDRAULIC MOTOR DRIVING DEVICE

TECHNICAL FIELD

The present invention relates to a variable hydraulic motor driving device capable of switching an operation state of a hydraulic motor while driving the motor, between a low-speed mode in which the motor rotates at low speed (low-speed rotation) and a high-speed mode in which the motor rotates at high speed (high-speed rotation).

BACKGROUND ART

There has been known a variable hydraulic motor driving device capable of switching an operation state of a hydraulic motor while driving the motor, between the low-speed mode of low-speed rotation and the high-speed mode of high-speed rotation (see patent documents 1 and 2). A device disclosed in the patent document 1 (speed change device of hydraulic traveling vehicle) is mounted in a hydraulic traveling vehicle of which speed can be changed between a low-speed and a high-speed. This device enables an operator to perform change operation between low-speed travel and high-speed travel, depending on the conditions of a site or a purpose. Thus, that device is configured so that: when a speed selecting switch (13) is set to OFF, the hydraulic motor rotates at low speed; while when the speed selecting switch (13) is set to ON, the hydraulic motor rotates at high speed.

On the other hand, a device disclosed in the patent document 2 (speed change device of hydraulic traveling vehicle) was made for the purpose of eliminating the inconvenience of the above-described change operation. The device disclosed in the patent document 2 has a circuitry configured so that the travel mode can be changed simply by setting the speed selecting switch (13) to ON: the travel mode is switched to low-speed travel at a time of start and immediately before a stoppage, is switched to low-speed travel when a traveling load becomes large during high-speed travel, and is returned to high-speed travel when the traveling load is decreased.

Patent document 1: Japanese Unexamined Patent Publication No. 235135/1988 (Tokukai 63-235135) (pages 1 to 2, and FIG. 2)

Patent document 2: Japanese Unexamined Patent Publication No. 235135/1988 (Tokukai 63-235135) (pages 3 to 4, and FIG. 1)

DISCLOSURE OF THE INVENTION

Problems to be Solved by the Invention

However, about the device disclosed in the patent document 1, there are the below-described problems. In a case where pressure setting of a relief valve communicating with the hydraulic motor has been made so as to correspond to the low-speed mode of the hydraulic motor but the hydraulic motor is not in the low-speed mode (i.e., in a high-speed mode) at a time of stoppage, the discharge displacement of the hydraulic motor is small. This causes a problem that braking operation takes a long time, that is, the period of time from the start of the stoppage operation to a complete stoppage is long. On the other hand, in the case where pressure setting of the relief valve has been made so as to correspond to the high-speed mode of the hydraulic motor but the hydraulic motor is not in the high-speed mode (i.e., in the low-speed mode) at a time of stoppage, the discharge displacement of the hydraulic motor is large. Therefore, the period of time for braking operation is too short, causing a problem that a large shock occurs at a time of stoppage.

In the meantime, the device disclosed in the patent document 2 is arranged so that: in response to the shifts of both of left and right traveling valves (2, 2') back to respective neutral positions during high-speed travel, the pressures of pilot pressure receiving portions (34L, 34R, 34L', 34R') become equal to a tank pressure, so that a pressure switch for pilot pressure (37), which communicates with these pressure receiving portions through shuttle valves, is turned OFF, and thereby the hydraulic motor is switched to the low-speed mode. Because of this arrangement, after the left and right traveling valves (2, 2') are shifted back to the neutral positions to start stoppage operation, the hydraulic motor is immediately switched to the low-speed mode, and as a result, large braking force is generated from an early stage of braking operation. This causes a problem that a large shock occurs at a time of stoppage.

The present invention has been made taking the foregoing problems into consideration, and an object of the present invention is to provide a variable hydraulic motor driving device which is capable of preventing braking operation from being excessively long, and also capable of preventing a large shock from occurring at a time of stoppage due to a large braking force generated from an early stage of braking operation.

Means for Solving the Problems and Effects

A variable hydraulic motor driving device according to the present invention relates to a variable hydraulic motor driving device including: a hydraulic motor which is switched, by varying motor displacement, between a low-speed mode in which the motor rotates at low speed and a high-speed mode in which the motor rotates at high speed; a speed changing mechanism including a tilt piston which varies the motor displacement of the hydraulic motor, and a high-low speed switching valve which switches a state of a supply passage between an open state and a close state, the supply passage supplying pressure oil to a pressure chamber of the tilt piston; a speed signal pilot passage through which a speed signal is transmitted, in a form of a pilot pressure, to the high-low speed switching valve; a supply port and a discharge port of the hydraulic motor, the supply port and the discharge port communicating with a direction changeover valve which controls supply/discharge of pressure oil; a counterbalance valve disposed between the hydraulic motor and the direction changeover valve; and a relief valve which communicates with the supply port and the discharge port, and has a set pressure corresponding to the low-speed mode, in which device, the hydraulic motor is switched to the high-speed mode when pressure oil is supplied to the pressure chamber of the tilt piston based on the transmission of the speed signal to the high-low speed switching valve, and the hydraulic motor is switched to the low-speed mode when pressure oil is discharged from the pressure chamber of the tilt piston.

To achieve the above object, the variable hydraulic motor driving device according to a first aspect of the present invention is characterized by further including a first braking purpose speed changing mechanism which operates so as to discharge pressure oil from the pressure chamber of the tilt piston when a pressure of pressure oil between the counterbalance valve and the direction changeover valve becomes equal to a tank pressure.

According to this structure, in the variable hydraulic motor driving device having the hydraulic motor whose mode is switched between the low-speed mode and the high-speed mode by the speed changing mechanism, when the direction changeover valve is shifted to a neutral position so that the pressure of pressure oil between the counterbalance valve and the direction changeover valve becomes equal to the tank pressure, the first braking purpose speed changing mechanism operates so as to discharge pressure oil from the pressure chamber of the tilt piston. Thus, the direction changeover valve is shifted to the neutral position during high-speed travel, then the pressure of pressure oil between the counterbalance valve and the direction changeover valve becomes equal to the tank pressure, and as a result, the hydraulic motor is switched from the high-speed mode to the low-speed mode. Therefore, at an early stage of a braking operation that is the stage immediately after the direction changeover valve is shifted to the neutral position, the hydraulic motor is in a transition state between the high-speed mode and the low-speed mode. This restrains a large braking force generated from the early stage of the braking operation. In addition, since brake torque increases continuously as the mode transits from the high-speed mode to the low-speed mode during the braking operation, it is possible to prevent braking operation from being excessively long, unlike the case where the high-speed mode is maintained. Therefore, the structure of the present invention makes it possible to prevent braking operation from being excessively long, and to prevent a large shock from occurring at a time of stoppage due to a large braking force generated from an early stage of braking operation.

It is desirable that the variable hydraulic motor driving device according to the first aspect of the present invention is configured so that: the first braking purpose speed changing mechanism has a first changeover valve which switches a state of the speed signal pilot passage between an open state and a close state, and a first changeover valve passage which connects a part between the counterbalance valve and the direction changeover valve with a pilot chamber of the first changeover valve; and the first changeover valve switches the state of the speed signal pilot passage from the open state to the close state when the pressure of pressure oil between the counterbalance valve and the direction changeover valve becomes equal to the tank pressure.

In this structure, when the pressure of pressure oil between the counterbalance valve and direction changeover valve becomes equal to the tank pressure, the pressure at the pilot chamber of the first changeover valve becomes equal to the tank pressure, so that the speed signal pilot passage is switched to the close state. This causes the high-low speed switching valve to switch the supply passage to the close state, which passage supplies pressure oil to the pressure chamber of the tilt piston, so that pressure oil is discharged from the pressure chamber, and as a result, the hydraulic motor is switched to the low-speed mode. Thus, since the variable hydraulic motor driving device is provided with the first braking purpose speed changing mechanism which includes the first changeover valve and the first changeover valve passage, external piping or the like is not needed, and therefore structural complexity can be reduced.

It is desirable that the variable hydraulic motor driving device according to the first aspect of the present invention is configured so that: (i) the first braking purpose speed changing mechanism has: a second changeover valve which switches a state of a drain passage between an open state and a close state, through which passage the pressure chamber of the tilt piston communicates with a tank; and a second changeover valve passage which connects a part between the counterbalance valve and the direction changeover valve with a pilot chamber of the second changeover valve; and (ii) the second changeover valve switches the state of the drain passage from the close state to the open state when the pressure of pressure oil between the counterbalance valve and the direction changeover valve becomes equal to the tank pressure.

In this structure, when the pressure of pressure oil between the counterbalance valve and the direction changeover valve becomes equal to the tank pressure, the pressure at the pilot chamber of the second changeover valve becomes equal to the tank pressure, so that the drain passage is switched to the open state. This causes the pressure chamber of the tilt piston to communicate with the tank, so that pressure oil is discharged from the pressure chamber, and as a result, the hydraulic motor is switched to the low-speed mode. Thus, since the variable hydraulic motor driving device is provided with the first braking purpose speed changing mechanism which includes the second changeover valve and the second changeover valve passage, external piping or the like is not needed, and therefore structural complexity can be reduced.

To achieve the above object, the variable hydraulic motor driving device according to a second aspect of the present invention is characterized by further including a second braking purpose speed changing mechanism which operates so as to discharge pressure oil from the pressure chamber of the tilt piston in response to a shift of the counterbalance valve to a neutral position.

According to this structure, in the variable hydraulic motor driving device having the hydraulic motor whose mode is switched between the low-speed mode and the high-speed mode by the speed changing mechanism, in response to a shift of the counterbalance valve to the neutral position, the second braking purpose speed changing mechanism operates so as to discharge pressure oil from the pressure chamber of the tilt piston. Therefore, when stoppage operation is started during high-speed travel, the counterbalance valve is shifted to the neutral position, and as a result, the hydraulic motor is switched from the high-speed mode to the low-speed mode. Accordingly, at an early stage of the braking operation, the hydraulic motor is in a transition state between the high-speed mode and the low-speed mode. This restrains a large braking force from being generated from the early stage of the braking operation. In addition, since brake torque increases continuously as the mode transits from the high-speed mode to the low-speed mode during the braking operation, it is possible to prevent braking operation from being excessively long, unlike the case where the high-speed mode is maintained. Therefore, the structure of the present invention makes it possible to prevent braking operation from being excessively long, and also to prevent a large shock from occurring at a time of stoppage due to a large braking force generated from the early stage of braking operation.

It is desirable that the variable hydraulic motor driving device according to the second aspect of the present invention is configured so that: the second braking purpose speed changing mechanism has a third changeover valve which switches a state of the speed signal pilot passage between an open state and a close state; and the third changeover valve is formed integrally with the counterbalance valve, and is configured so as to close the speed signal pilot passage in response to a shift of the counterbalance valve to the neutral position and so as to open the speed signal pilot passage in response to a shift of the counterbalance valve to a changeover position.

In this structure, the third changeover valve switches the state of the pilot passage to the close state in response to a shift of the counterbalance valve to the neutral position. This causes the high-low speed switching valve to switch the supply passage to the close state, which passage supplies pressure oil to the pressure chamber of the tilt piston, so that the pressure oil is discharged from the pressure chamber, and as a result, the hydraulic motor is switched to the low-speed mode. Since the third changeover valve is formed integrally with the counterbalance valve, it is possible to restrain the increase in the number of components.

It is desirable that the variable hydraulic motor driving device according to the second aspect of the present invention is configured so that: the second braking purpose speed changing mechanism has a fourth changeover valve which switches a state of a drain passage between an open state and a close state, through which passage the pressure chamber of the tilt piston communicates with a tank; and the fourth changeover valve is formed integrally with the counterbalance valve, and is configured so as to open the drain passage in response to a shift of the counterbalance valve to the neutral position and so as to close the drain passage in response to a shift of the counterbalance valve to a changeover position.

In this structure, the fourth changeover valve switches the state of the drain passage to the open state in response to a shift of the counterbalance valve to the neutral position. This causes the pressure chamber of the tilt piston to communicate with the tank, so that pressure oil is discharged from the pressure chamber, and as a result, the hydraulic motor is switched to the low-speed mode. Since the fourth changeover valve is formed integrally with the counterbalance valve, it is possible to restrain the increase in the number of components.

REFERENCE NUMERALS

Figure 1:
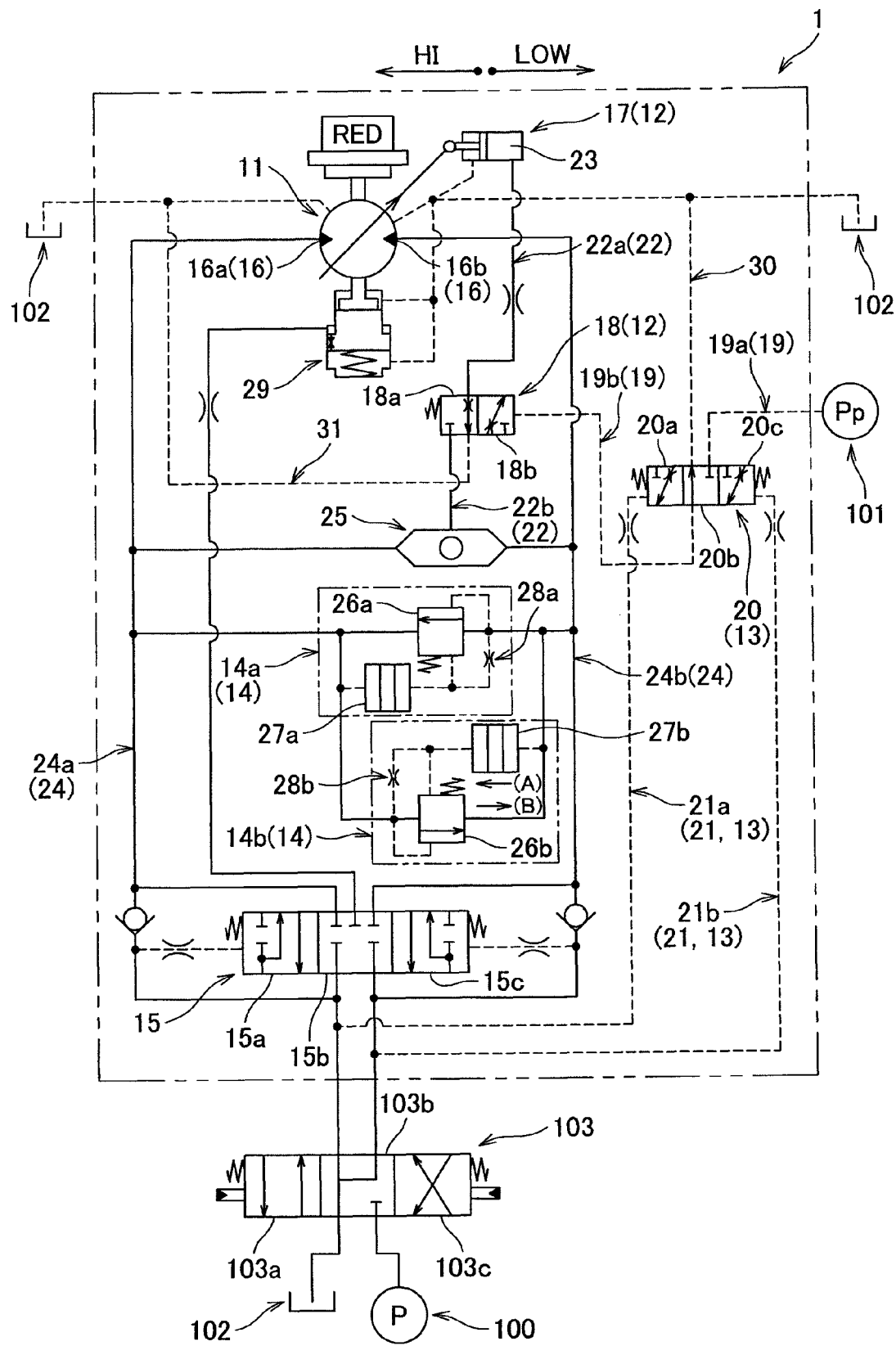
FIG. 1 A hydraulic circuit diagram showing a variable hydraulic motor driving device according to a first embodiment of the present invention.

1 Variable hydraulic motor driving device
11 Hydraulic motor
12 speed changing mechanism
13 Braking purpose speed changing mechanism (first braking purpose speed changing mechanism)
14, 14a, 14b Relief valve
15 Counterbalance valve
16 Supply and discharge port (supply port and discharge port)
17 Tilt piston
18 high-low speed switching valve
19, 19a, 19b Speed signal pilot passage
20 First changeover valve
21, 21a, 21b First changeover valve passage
22, 22a, 22b Supply passage
23 Pressure chamber of tilt piston

BEST MODE FOR CARRYING OUT THE INVENTION

Preferred embodiments of the present invention will be hereinafter described with reference to the accompanying drawings. Note that variable hydraulic motor driving devices according to the embodiments of the present invention can be applied to a construction vehicle for example, however, it is not limited to a construction vehicle. The variable hydraulic motor driving devices can be widely used as a variable hydraulic motor driving device capable of switching an operation state of a hydraulic motor while driving the motor, between a low-speed mode in which the motor rotates at low speed (low-speed rotation) and a high-speed mode in which the motor rotates at high speed (high-speed rotation).

First Embodiment

FIG. 1 is a hydraulic circuit diagram showing a variable hydraulic motor driving device 1 according to a first embodiment of the present invention. The variable hydraulic motor driving device 1 shown in FIG. 1 is mounted in a not-shown construction vehicle and is connected to a pump 100 which supplies pressure oil, a pilot pump 101 which supplies pilot pressure oil, and a tank 102. The variable hydraulic motor driving device 1 is connected to the pump 100 and the tank 102, through a direction changeover valve 103 which switches the operation state of a hydraulic motor 11 by controlling supply/discharge of pressure oil to/from the hydraulic motor 11.

The variable hydraulic motor driving device 1 includes the hydraulic motor 11, a speed changing mechanism 12, a braking purpose speed changing mechanism (a first braking purpose speed changing mechanism of the present invention) 13, relief valves 14 (14a and 14b), a counterbalance valve 15, and the like. In addition, the variable hydraulic motor driving device 1 is provided with various passages such as speed signal pilot passages 19, supply passages 22, and supply and discharge passages 24.

The hydraulic motor 11 has a swash plate whose tilt angle is variable, and is configured as a variable displacement motor which is capable of varying the motor displacement by varying the tilt angle of the swash plate. The hydraulic motor 11 is switched, in accordance with the variation in the motor displacement, between a low-speed mode of high torque low-speed rotation and a high-speed mode of low torque high-speed rotation. The hydraulic motor 11 drives a not-shown crawler and the like through a speed reducer. The construction vehicle travels at low speed when the hydraulic motor 11 is in the low-speed mode, while the construction vehicle travels at high speed when the hydraulic motor 11 is in the high-speed mode. In addition, the hydraulic motor 11 is provided with supply and discharge ports 16 (16a, 16b) which communicate with, through the supply and discharge passages 24 (24a, 24b) respectively, a direction changeover valve 103 which controls supply/discharge of pressure oil. Note that the supply and discharge ports 16 (16a, 16b) are formed so as to function as a supply port and a discharge port respectively, depending on the shift state of the direction changeover valve 103. That is, when the direction changeover valve 103 is in a changeover position 103a, the supply and discharge port 16b functions as a supply port while the supply and discharge port 16a functions as a discharge port. When the direction changeover valve 103 is in a changeover position 103c, the supply and discharge port 16a functions as a supply port while the supply and discharge port 16b functions as a discharge port.

The speed changing mechanism 12 includes a tilt piston 17 and a high-low speed switching valve 18. The tilt piston 17 is arranged so as to vary the motor displacement of the hydraulic motor 11 by varying the tilt angle of the swash plate of the hydraulic motor 11. The supply passages 22 are connected to a pressure chamber 23 of the tilt piston 17. When pressure oil is supplied to the pressure chamber 23 of the tilt piston 17 through the supply passages 22, a rod of the tilt piston 17 is moved in a direction of arrow "HI" in the figure, and the hydraulic motor 11 is switched to the high-speed mode in which the motor displacement of the hydraulic motor 11 is small. On the other hand, when pressure oil is discharged from the pressure chamber 23 of the tilt piston 17, the rod of the tilt piston 17 is moved in a direction of arrow "LOW" in the figure, and the hydraulic motor 11 is switched to the low-speed mode in which the motor displacement of the hydraulic motor 11 is large.

The high-low speed switching valve 18 of the speed changing mechanism 12 is provided as a changeover valve which switches the state of the supply passages 22 supplying pressure oil to the pressure chamber 23 of the piston 17, between an open state and a close state. In the variable hydraulic motor driving device 1, the speed signal pilot passages 19 (19a, 19b) are provided to connect the pilot pump 101 with a pilot chamber of the high-low speed switching valve 18. This structure allows a speed signal to be transmitted as a pilot pressure to the high-low speed switching valve 18 through the speed signal pilot passages 19. When a speed signal is transmitted to the high-low speed switching valve 18, the high-low speed switching valve 18 is shifted to a changeover position 18b, thereby causing the supply passages 22 to be in the open state (connecting the supply passages 22a and 22b). Meanwhile, when the speed signal is removed (in a state where a speed signal is not transmitted to the high-low speed switching valve 12), the high-low speed switching valve 18 is shifted to a changeover position 18a, thereby causing the supply passages 22 to be in the close state (closing communication between the supply passages 22a and 22b). The supply passages 22 are connected to the supply and discharge passages 24 via a shuttle valve 25. Pressure oil is selectively supplied to the supply passages 22 via the shuttle valve 25 from either the supply and discharge passage 24a or the supply and discharge passage 24b, whichever has higher pressure of pressure oil.

As described above, the variable hydraulic motor driving device 1 is provided with the speed changing mechanism 12, the speed signal pilot passages 19, and the like. Thus, the variable hydraulic motor driving device 1 has a configuration such that: the hydraulic motor 11 is switched to the high-speed mode when pressure oil is supplied to the pressure chamber 23 of the tilt piston 17 based on the transmission of a speed signal to the high-low speed switching valve 18; and the hydraulic motor 11 is switched to the low-speed mode when pressure oil is discharged from the pressure chamber 23 of the tilt piston 17.

The relief valves 14 (14a, 14b) are provided so as to communicate with the supply and discharge ports 16 (16a, 16b) through the supply and discharge passages 24 (24a, 24b) respectively. These relief valves 14 are constituted of: the relief valve 14a which is capable of relieving, to the supply passage 24a, pressure oil supplied from the supply and discharge passage 24b; and the relief valve 14b which is capable of relieving, to the supply and discharge passage 24b, pressure oil supplied from the supply and discharge passage 24a. The relief valve 14a is provided with a valve 26a, a piston 27a, and a throttle 28a. The relief valve 14b is provided with a valve 26b, a piston 27b, and a throttle 28b. The respective relief valves 14a and 14b are adjusted to have set pressures corresponding to the low-speed mode of the hydraulic motor 11 in such a way that the spring constants of the valves 26a and 26b, the volumes of the pistons 27a and 27b, and the throttle amounts of the throttles 28a and 28b are appropriately set, respectively.

The counterbalance valve 15 is disposed between the hydraulic motor 11 and the direction changeover valve 103. For example, when the direction changeover valve 103 is in a changeover position 103a, pressure oil supplied to the supply and discharge passage 24b acts on one pilot chamber of the counterbalance valve 15, so that the counterbalance valve 15 is shifted to a changeover position 15c. Because of this, pressure oil from the pump 100 circulates in such a way that the pressure oil passes through the supply and discharge passage 24b, the hydraulic motor 11, and the supply and discharge passages 24a, before returning to the tank 102. In a state where the counterbalance valve 15 is in a changeover position 15a or 15c, braking operation of the hydraulic motor 11 is not performed since pressure oil from the pump 100 acts on a negative brake 29. However, when the counterbalance valve 15 is returned to a neutral position 15b, braking operation of the hydraulic motor 11 is performed since pressure oil from the pump 100 does not act on the negative brake 29.

The braking purpose speed changing mechanism 13 includes a first changeover valve 20 and first changeover valve passages 21 (21a, 21b). The first changeover valve 20 is provided as a changeover valve which switches the state of the speed signal pilot passages 19 between an open state and a close state. That is, communication is established between the speed signal pilot passages 19a and 19b when the first changeover valve 20 is shifted to a changeover position 20a or 20c, while communication is closed between the speed signal pilot passages 19a and 19b when the first changeover valve 20 is shifted to a neutral position 20b.

The first changeover valve passages 21 (21a, 21b) are provided as passages which connect parts between the counterbalance valve 15 and the direction changeover valve 103 with pilot chambers of the first changeover valve 20, respectively. The first changeover valve passage 21a communicates with the supply and discharge passage 24a, and is provided as a passage on which a pilot pressure acts to shift the first changeover valve 20 to the changeover position 20a when the direction changeover valve 103 is shifted to the changeover position 103c. The first changeover valve passage 21b communicates with the supply and discharge passage 24b, and is provided as a passage on which a pilot pressure acts to shift the first changeover valve 20 to the changeover position 20c when the direction changeover valve 103 is shifted to the changeover position 103a.

In the braking purpose speed changing mechanism 13 which includes the above-mentioned first changeover valve 20 and the first changeover valve passages 21, when the shift of the direction changeover valve 103 to a neutral position 103b causes the pressure of pressure oil between the counterbalance valve 15 and the direction changeover valve 103 to become equal to a tank pressure, both of the first changeover valve passages 21a and 21b communicate with the tank 102, so that the pressures of both pilot chambers of the first changeover valve 20 become equal to the tank pressure. Therefore, by the action of springs which bias the respective ends of a spool of the first changeover valve 20, the first changeover valve 20 is shifted to the neutral position 20b, and this state is maintained. This switches the state of the speed signal pilot passages 19 from the open state to the close state, with the result that the pilot chamber of the high-low speed switching valve 18 communicates with the tank 102 through the speed signal pilot passage 19b, the first changeover valve 20, and a passage 30, so that a speed signal is removed. In turn, this causes the high-low speed switching valve 18 to close communication between the supply passages 22, and causes the pressure chamber 23 of the tilt piston 17 to communicate with the tank 102 through the supply passage 22a and a passage 31. Thus established communication between the pressure chamber 23 and the tank 102 forces pressure oil in the pressure chamber 23 to be discharged to the tank 102, and as a result, the hydraulic motor 11 is switched to the low-speed mode. In this manner, the braking purpose speed changing mechanism 13 is arranged so as to discharge the pressure oil from the pressure chamber 23 of the tilt piston 17 when the pressure of pressure oil between the counterbalance valve 15 and the direction changeover valve 103 becomes equal to the tank pressure.

The followings describe the operation of the variable hydraulic motor driving device 1 having the above-described structure. The following explanation deals with a case where the direction changeover valve 103 is shifted from the neutral position 103b to the changeover position 103a so that the not-shown construction vehicle is started to travel, and a case where the direction changeover valve 103 is then shifted back to the neutral position 103b so that braking operation is performed, as examples. For the case where the direction changeover valve 103 is shifted to the changeover position 103c so that travel is started and then braking operation is performed, explanation will be omitted because of the similarity.

In the case where the direction changeover valve 103 is shifted to the changeover position 103a so that the construction vehicle is started to travel, the shift of the direction changeover valve 103 allows pressure oil from the pump 100 to be supplied to the hydraulic motor 11 through the supply and discharge passage 24b. Then, the counterbalance valve 15 is operated and shifted to the changeover position 15c, so that pressure oil is discharged from the hydraulic motor 11 to the tank 102 through the supply and discharge passage 24a, the counterbalance valve 15, and the direction changeover valve 103. This causes the traveling motor 11 to start rotation in a predetermined direction. At this time, pilot pressure oil acts on the pilot chambers of the first changeover valve 20 through the first changeover valve passage 21b, so that the first changeover valve 20 is shifted to the changeover position 20c, and a speed signal is transmitted to the high-low speed switching valve 18 through the speed signal pilot passages 19. With this, the high-low speed switching valve 18 is shifted to the changeover position 18b, and pressure oil is introduced into the pressure chamber 23 of the tilt piston 23 through the shuttle valve 25 and the supply passages 22. Accordingly, the hydraulic motor 11 rotates in the high-speed mode. During such high-speed travel, pressure oil from the a supply and discharge passages 24b acts on the piston 27b of the relief valve 14b and therefore the piston 27b is moved to and remains at the end of its stroke in a direction of an arrow (A) in the figure.

On the other hand, when braking operation is performed, the direction changeover valve 103 is shifted from the changeover position 103a to the neutral position 103b, with the result that pressure oil is not supplied to the hydraulic motor 11 through the supply and discharge passage 24b. Then, the pressure oil from the pump 100 no longer acts on the negative brake 29, and thereby braking operation is started. When the shift of the direction changeover valve 103 to the neutral position 103b causes the pressure of pressure oil between the counterbalance valve 15 and the direction changeover valve 103 to become equal to the tank pressure, the first changeover valve 20 is shifted to the neutral position 20b. With this, a speed signal is removed, which in turn shifts the high-low speed switching valve 18 to the changeover position 18a. Then, pressure oil is discharged from the pressure chamber 23 of the tilt piston 17, and as a result, the hydraulic motor 11 is switched to the low-speed mode. Therefore, the hydraulic motor 11 is not switched to the low-speed mode immediately after the braking operation is started, but the hydraulic motor 11 is switched from the high-speed mode to the low-speed mode gradually during the braking operation. During the braking operation, pressure oil discharged due to inertial rotation of the hydraulic motor 11 acts on the piston 27b of the relief valve 14b, so that the piston 27b is biased in the direction of an arrow (B) in the figure. When the piston 27b is moved in the direction of the arrow (B) and reaches the end of its stroke in that direction, pressure oil acts on pressure chambers at the both sides of the valve 26b, and communication is established between the supply and discharge passages 24a and 24b when the pressure of the pressure oil becomes equal to a set pressure.

Figure 2:
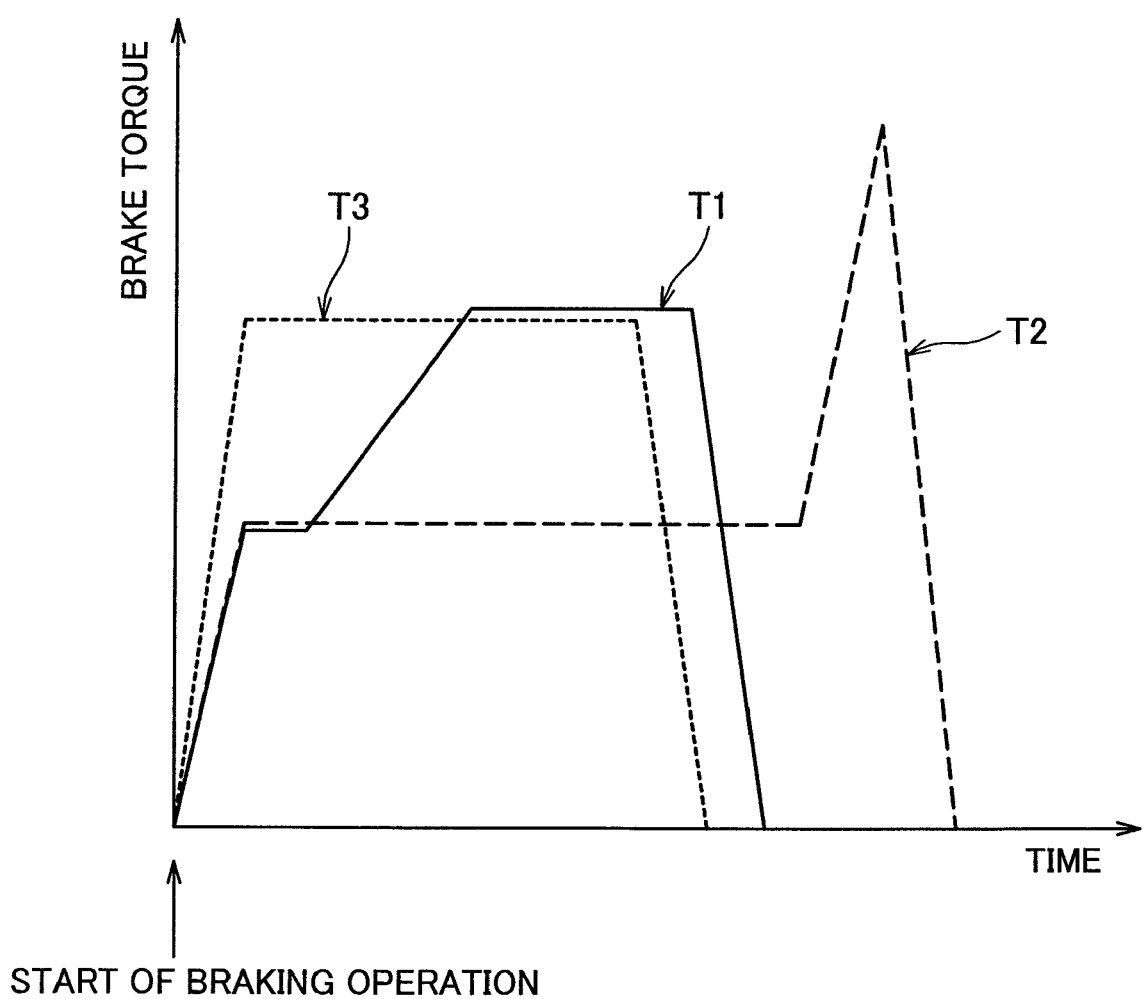
FIG. 2 A diagram illustrating variations, after the start of braking operation, in brake torque which is generated during the braking operation.

FIG. 2 is a diagram illustrating variations, after the start of braking operation, in brake torque which is generated during braking operation. Brake torque variation T1 indicated by a solid line in the figure represents torque variation during the braking operation by the variable hydraulic motor driving device 1. Meanwhile, brake torque variation T2 indicated by a broken line in the figure represents torque variation for the case where braking operation is performed while the hydraulic motor 11 remains in the high-speed mode. In addition, brake torque variation T3 indicated by a dotted line in the figure represents torque variation for the case where the hydraulic motor 11 is switched to the low-speed mode immediately after the braking operation is started.

As shown in the brake torque variation T1 of FIG. 2, when braking operation is started in the variable hydraulic motor driving device 1, brake torque is generated. At an early stage of the braking operation, the hydraulic motor 11 is in the high-speed mode and rotates at a low torque, and therefore corresponding brake torque is low. However, since the hydraulic motor 11 is gradually shifted from the high-speed mode to the low-speed mode, brake torque increases along with the shift. Then, after the hydraulic motor 11 is completely shifted to the low-speed mode, brake torque is high, corresponding to high torque of the low-speed mode. Then, at a stage where the rotation of the hydraulic motor 11 stops (construction vehicle is stopped to travel), the brake torque disappears.

However, if the braking operation is performed with the hydraulic motor 11 being in the high-speed mode, i.e., not being shifted to the low-speed mode, low brake torque corresponding to the high-speed mode is maintained from the early stage of the braking operation to a stage before the hydraulic motor 11 is stopped, as shown in brake torque variation T2 of FIG. 2. In such a case where the hydraulic motor 11 remains in the high-speed mode, the displacement of the hydraulic motor 11 is small, and therefore it takes a long time for the piston 27b of the relief valve 14b to move to the end of its stroke. Accordingly, more time is required before stoppage, compared with the case of the variable hydraulic motor driving device 1, which is represented by the brake torque variation T1. On the other hand, if the hydraulic motor 11 is switched to the low-speed mode immediately after the braking operation is started, high brake torque corresponding to the low-speed mode is generated and is maintained thereafter, as indicated by the brake torque variation T3 of FIG. 2. Therefore, large braking force is generated from the early stage of the braking operation, resulting in sharp deceleration and a large shock. Accordingly, as indicated by the brake torque variation T1, for the case of the variable hydraulic motor driving device 1, the period of time for the braking operation is not long as compared to the case of the brake torque variation T2, and also it is possible to prevent a large shock caused by a large braking force generated at the early stage of the braking operation, which shock occurs in the case of brake torque variation T3.

As described above, according to the variable hydraulic motor driving device 1, when the direction changeover valve 103 is shifted to the neutral position 013b with the result that the pressure of pressure oil between the counterbalance valve 15 and the direction changeover valve 103 becomes equal to the tank pressure, the braking purpose speed changing mechanism 13 operates so that the pressure oil is discharged from the pressure chamber 23 of the tilt piston 17. Because of this, after the direction changeover valve 103 is shifted to the neutral position 103b during high-speed travel, the pressure of pressure oil between the counter balance valve 15 and the direction changeover valve 103 becomes equal to the tank pressure, and as a result, the hydraulic motor 11 is switched from the high-speed mode to the low-speed mode. Thus, at an early stage of braking operation that is the stage immediately after the direction changeover valve 103 is shifted to the neutral position 103c, the hydraulic motor 11 is in a transition state between the high-speed mode and the low-speed mode. This restrains a large braking force from being generated from the early stage of the braking operation. In addition, since brake torque increases continuously as the mode transits from the high-speed mode to the low-speed mode during the braking operation, it is possible to prevent braking operation from being excessively long, unlike the case where the high-speed mode is maintained. Therefore, according to the variable hydraulic motor driving device 1, it is possible to prevent braking operation from being excessively long, and also to prevent a large shock from occurring at a time of stoppage due to a large braking force generated from the early stage of braking operation.

In addition, according to the variable hydraulic motor driving device 1, when the pressure of pressure oil between the counterbalance valve 15 and the direction changeover valve 103 becomes equal to the tank pressure, the pressures at the pilot chambers of the first changeover valve 20 become equal to the tank pressure, so that the speed signal pilot passages 19 are switched to the close state. This causes the high-low speed switching valve 18 to close communication between the supply passages 22, which supply pressure oil to the pressure chamber 23 of the tilt piston 17, so that the pressure oil is discharged from the pressure chamber 23, and as a result, the hydraulic motor is switched to the low-speed mode. Accordingly, since the variable hydraulic motor driving device 1 is provided with the braking purpose speed changing mechanism 13 which includes the first changeover valve 20 and the first changeover valve passages 21, external piping or the like is not needed, and therefore structural complexity can be reduced.

Second Embodiment

Figure 3:
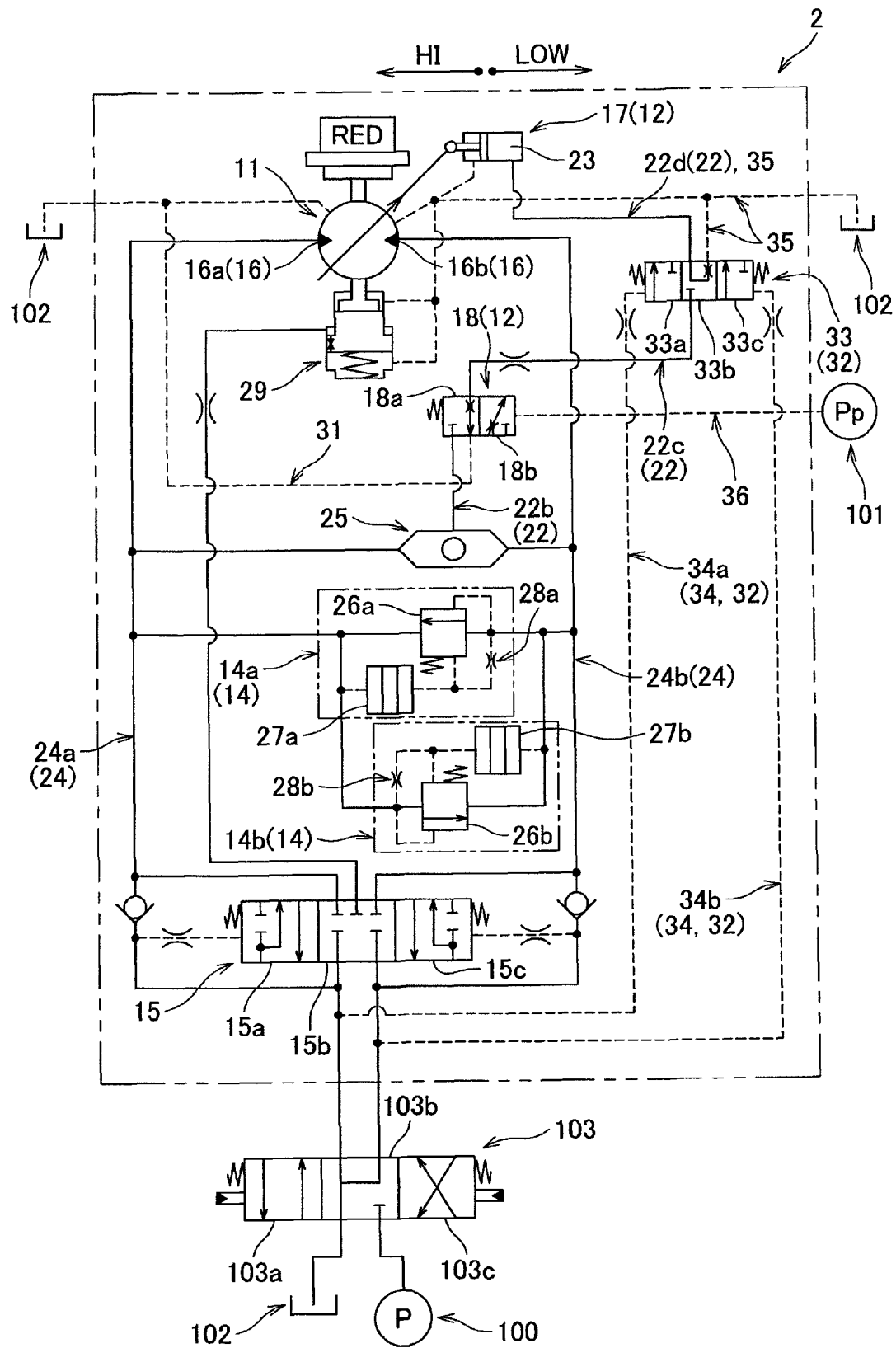
FIG. 3 A hydraulic circuit diagram showing a variable hydraulic motor driving device according to a second embodiment of the present invention.

The followings describe a variable hydraulic motor driving device according to a second embodiment of the present invention. FIG. 3 is a hydraulic circuit diagram showing a variable hydraulic motor driving device 2 according to the second embodiment. The variable hydraulic motor driving device 2 shown in FIG. 3 is mounted in a not-shown construction vehicle, as same as the variable hydraulic motor driving device 1 of the first embodiment. The variable hydraulic motor driving device 2 is connected to a pump 100, a pilot pump 101, and a tank 102, and is connected to the pump 100 and the tank 102 through a direction changeover valve 103.

The variable hydraulic motor driving device 2 includes a hydraulic motor 11, a speed changing mechanism 12, a braking purpose speed changing mechanism (the first braking purpose speed changing mechanism of the present invention) 32, relief valves 14, a counterbalance valve 15, a speed signal pilot passage 36, and the like, in the same way as the first embodiment. However, the second embodiment is different from the first embodiment in the structures of the braking purpose speed changing mechanism 32, the speed signal pilot passage 36, and supply passages 22, and the second embodiment is also different in that a drain passage 35 is provided through which a pressure chamber 23 of a tilt piston 17 communicates with a tank 102. Note that in the description on the second embodiment, the same reference numeral is given to the same element as in the first embodiment, and description of the same element is omitted.

As shown in FIG. 3, in the variable hydraulic motor driving device 2, the speed signal pilot passage 36 which connects the pilot pump 101 with a pilot chamber of a high-low speed switching valve 18 is always open. That is, the variable hydraulic motor driving device 2 does not include the first changeover valve which switches the state of the speed signal pilot passage between the open state and the close state, which valve is provided in the first embodiment.

The braking purpose speed changing mechanism 32 of the variable hydraulic motor driving device 2 includes a second changeover valve 33 and second changeover valve passages 34 (34a, 34b). The second changeover valve 33 is provided as a changeover valve which switches the state of the drain passage 35 between an open state and a close state. In other words, the second changeover valve 33 is arranged: so as to close the drain passage 35 when the second changeover valve 33 is shifted to a changeover position 33a or 33c; and so as to open the drain passage 35 when the second changeover valve 33 is shifted to a neutral position 33b. In addition, among the supply passages 22, a supply passage 22c and a supply passage 22d, which communicate with each other through the second changeover valve 33, constitute a passage between the high-low speed switching valve 18 and the pressure chamber 23 of the tilt piston 17. Communication between the supply passages 22c and 22d is established when the second changeover valve 33 is shifted to the changeover position 33a or 33c, while communication between the supply passages 22c and 22d is closed when the second changeover valve 33 is shifted to the neutral position 33b. It should be noted that the supply passage 22d also functions as a part of the drain passage 35 (the supply passage 22d is shared between the supply passages 22 and the drain passage 35).

The second changeover valve passages 34 (34a, 34b) are provided as passages which connect parts between the counterbalance valve 15 and the direction changeover valve 103 with pilot chambers of the second changeover valve 33, respectively. The second changeover valve passage 34a communicates with a supply and discharge passage 24a, and is provided as a passage on which a pilot pressure acts to shift the second changeover valve 33 to the changeover position 33a when the direction changeover valve 103 is shifted to a changeover position 103c. The second changeover valve passage 34b communicates with a supply and discharge passage 24b, and is provided as a passage on which a pilot pressure acts to shift the second changeover valve 33 to the changeover position 33c when the direction changeover valve 103 is shifted to a changeover position 103a.

In the braking purpose speed changing mechanism 32 which includes the above-described second changeover valve 33 and second changeover valve passages 34, when the shift of the direction changeover valve 103 to a neutral position 103b causes the pressure of pressure oil between the counterbalance valve 15 and the direction changeover valve 103 to become equal to a tank pressure, both of the second changeover valve passages 34a and 34b communicate with the tank 102, so that the pressures at both of the pilot chambers of the second changeover valve 33 become equal to the tank pressure. Therefore, by the action of springs which bias the respective ends of a spool of the second changeover valve 33, the second changeover valve 33 is shifted to the neutral position 33b, and this state is maintained. This switches the state of the drain passage 35 from the close state to the open state, with the result that the pressure chamber 23 of the tilt piston 17 communicates with the tank 102, so that pressure oil in the pressure chamber 23 is discharged to the tank 102, and as a result, the hydraulic motor 11 is switched to a low-speed mode. In the meantime, when the direction changeover valve 103 is shifted to the changeover position 103a or 103c, the second changeover valve 33 is shifted to the changeover position 33a or 33c. Therefore, pressure oil is supplied to the pressure chamber 23 of the tilt piston 17 through the supply and discharge passage 24a or 24b, a shuttle valve 25, the high-low speed switching valve 18 which has been shifted to a changeover position 18b due to the transmission of a speed signal, the supply passage 22c, the second changeover valve 33, and the supply passage 22d, and as a result, the hydraulic motor 11 is switched to a high-speed mode.

According to the variable hydraulic motor driving device 2 of the second embodiment, when the pressure of pressure oil between the counterbalance valve 15 and the direction changeover valve 103 becomes equal to the tank pressure, the pressures at the pilot chambers of the second changeover valve 33 become equal to the tank pressure, so that the drain passage 35 is switched to the open state. This causes the pressure chamber 23 of the tilt piston 17 to communicate with the tank 102, so that the pressure oil is discharged from the pressure chamber 23, and as a result, the hydraulic motor 11 is switched to the low-speed mode. Therefore, in the same way as the first embodiment, at an early stage of braking operation, that is the stage immediately after the direction changeover valve 103 is shifted to the neutral position 103c, the hydraulic motor 11 is in a transition state between the high-speed mode and the low-speed mode. This restrains a large braking force from being generated from the early stage of the braking operation. In addition, since brake torque increases continuously as the mode transits from the high-speed mode to the low-speed mode during the braking operation, it is possible to prevent braking operation from being excessively long, unlike the case where the high-speed mode is maintained. Therefore, according to the variable hydraulic motor driving device 2, in the same way as the first embodiment, it is possible to prevent braking operation from being excessively long, and also to prevent a large shock from occurring at a time of stoppage due to a large braking force generated from the early stage of braking operation.

In addition, according to the second embodiment, since the variable hydraulic motor driving device 2 is provided with the braking purpose speed changing mechanism 32 which includes the second changeover valve 33 and the second changeover valve passages 34, external piping or the like is not needed, and therefore structural complexity can be reduced. According to this variable hydraulic motor driving device 2, operation of the hydraulic motor 11 is started from the low-speed mode at a time of startup of the hydraulic motor 11, and therefore it is possible to increase the starting torque, and to improve operability because the starting torque in response to a starting operation is constant.

Third Embodiment

Figure 4:
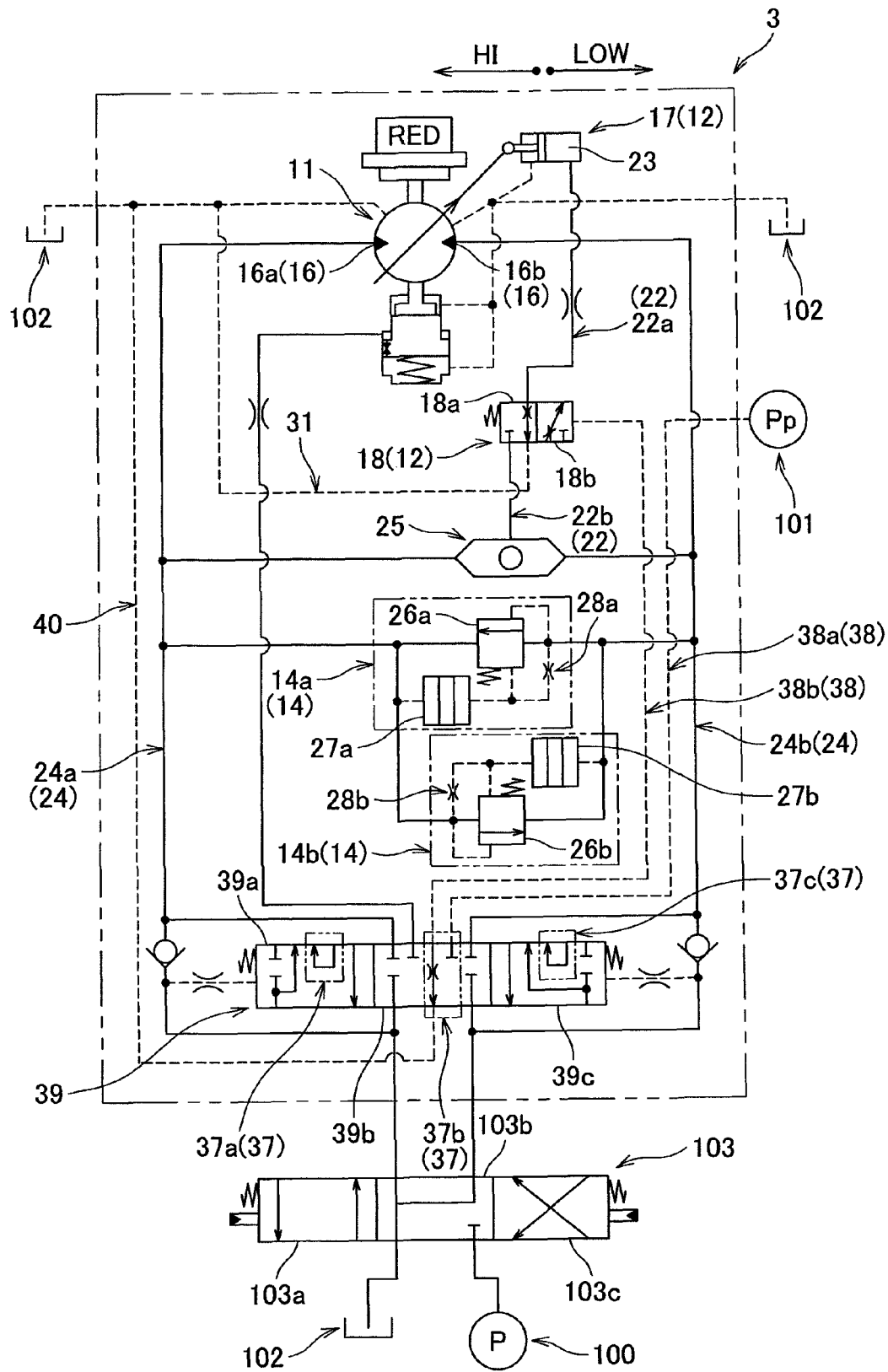
FIG. 4 A hydraulic circuit diagram showing a variable hydraulic motor driving device according to a third embodiment of the present invention.

The followings describe a variable hydraulic motor driving device according to a third embodiment of the present invention. FIG. 4 is a hydraulic circuit diagram showing a variable hydraulic motor driving device 3 according to the third embodiment. The variable hydraulic motor driving device 3 shown in FIG. 4 is mounted in a not-shown construction vehicle, as same as the variable hydraulic motor driving device 1 of the first embodiment. The variable hydraulic motor driving device 3 is connected to a pump 100, a pilot pump 102, and a tank 102, and is connected to the pump 100 and the tank 102 through a direction changeover valve 103.

The variable hydraulic motor driving device 3 includes a hydraulic motor 11, a speed changing mechanism 12, a braking purpose speed changing mechanism (a second braking purpose speed changing mechanism of the present invention) 37, relief valves 14, a counterbalance valve 39, speed signal pilot passages 38, and the like, in the same way as the first embodiment. However, the third embodiment is different from the first embodiment in the structures of the braking purpose speed changing mechanism 37, the speed signal pilot passages 38, and the counterbalance valve 39. In the description on the third embodiment, the same reference numeral is given to the same element as in the first embodiment, and description of the same element is omitted.

As shown in FIG. 4, in the variable hydraulic motor driving device 3, the braking purpose speed changing mechanism 37 is provided as a third changeover valve of the present invention, which is formed integrally with the counterbalance valve 39 (hereinafter, the braking purpose speed changing mechanism 37 is referred to as a third changeover valve 37 in this embodiment since it represents the same element as the third changeover valve). The speed signal pilot passages 38 (38a, 38b) are provided so as to connect a pilot pump 101 with a pilot chamber of a high-low speed switching valve 18 through the counterbalance valve 39. The counterbalance valve 39 is configured to function similarly to the counterbalance valve 15 of the first embodiment (the changeover positions 15a and 15c, and the neutral position 15b of the counterbalance valve 15 respectively correspond to changeover positions 39a and 39c, and a neutral position 39b of the counterbalance valve 39). As described above, the counterbalance valve 39 is formed integrally with the third changeover valve 37.

The third changeover valve 37, which is the braking purpose speed changing mechanism 37, is a changeover valve which is shifted along with the shift of the counterbalance valve 39, and is provided as a changeover valve which switches the state of the speed signal pilot passages 38 between an open state and a close state. In other words, this third changeover valve 37 is provided in the counterbalance valve 39 so that the third changeover valve 37 has (i) a close position 37b for closing the speed signal pilot passages 38 in response to a shift of the counterbalance valve 39 to the neutral position 39b, and (ii) open positions 37c and 37a for opening the speed signal pilot passages 38 in response to a shift of the counterbalance valve 39 to the changeover position 39a or 39c. The third changeover valve 37 is configured, when the third changeover valve 37 is shifted to the close position 37b, to close communication between the speed signal pilot passages 38a and 38b and to cause the speed signal pilot passage 38b to communicate with the tank 102 through a passage 40.

As described above, the braking purpose speed changing mechanism 37 is formed integrally with the counterbalance valve 39, and is formed as the third changeover valve 37 which has the open positions 37a and 37c, and the close position 37b, to which positions the third changeover valve 37 can be shifted. When the shift of the direction changeover valve 103 to the changeover position 103a or 103c causes the counterbalance valve 39 to be shifted to the changeover position 39c or 39a with the result that the third changeover valve 37 is shifted to the open position 37c or 37a, the braking purpose speed changing mechanism 37 establishes communication between the speed signal pilot passages 38a and 38b. With this, a speed signal is transmitted to the high-low speed switching valve 18, and thereby the high-low speed switching valve 18 is shifted to a changeover position 18b. Then, pressure oil is supplied to a pressure chamber 23 of a tilt piston 17 through supply passages 22, and as a result, the hydraulic motor 11 is switched to a high-speed mode. On the other hand, when the shift of the direction changeover valve 103 to a neutral position 103b causes the counterbalance valve 39 to be shifted to the neutral position 39b with the result that the third changeover valve 37 is shifted to the close position 37b, the braking purpose speed changing mechanism 37 closes communication between the speed signal pilot passages 38a and 38b and causes the speed signal pilot passage 38b to communicate with the tank 102. This removes the speed signal from the high-low speed switching valve 18, so that the high-low speed switching valve 18 is shifted to a changeover position 18a and thereby pressure oil in the pressure chamber 23 of the tilt piston 17 is discharged. Thus, the variable hydraulic motor driving device 3 operates so as to discharge pressure oil from the pressure chamber 23 of the tilt piston 17 in response to a shift of the counterbalance valve 39 to the neutral position 39b, and as a result, the hydraulic motor 11 is switched to a low-speed mode.

According to the variable hydraulic motor driving device 3 of the third embodiment, when the counterbalance valve 39 is shifted to the neutral position 39b, the braking purpose speed changing mechanism 37 operates to discharge pressure oil from the pressure chamber 23 of the tilt piston 17. Therefore, when stoppage operation is started during high-speed travel, the counterbalance valve 39 is shifted to the neutral position 39b, and as a result, the hydraulic motor 11 is switched from the high-speed mode to the low-speed mode. Therefore, in the same way as the first embodiment, at an early stage of the braking operation, the hydraulic motor is in a transition state between the high-speed mode and the low-speed mode. This restrains a large braking force from being generated from the early stage of the braking operation. In addition, since brake torque increases continuously as the mode transits from the high-speed mode to the low-speed mode during the braking operation, it is possible to prevent braking operation from being excessively long, unlike the case where the high-speed mode is maintained. Therefore, according to the variable hydraulic motor driving device 3, similar advantageous effects to those of the first embodiment can be obtained. That is, it is possible to prevent braking operation from being excessively long, and also to prevent a large shock from occurring at a time of stoppage due to a large braking force generated from the early stage of braking operation.

In addition, according to the variable hydraulic motor driving device 3, the third changeover valve 37, which closes communication between the pilot passages 38 in response to a shift of the counterbalance valve 39 to the neutral position 39b so that pressure oil is discharged from the pressure chamber 23 of the tilt piston 17 through the operation of the high-low speed switching valve 18, is formed integrally with the counterbalance valve 39. Therefore, it is possible to restrain the increase in the number of components.

Fourth Embodiment

Figure 5:
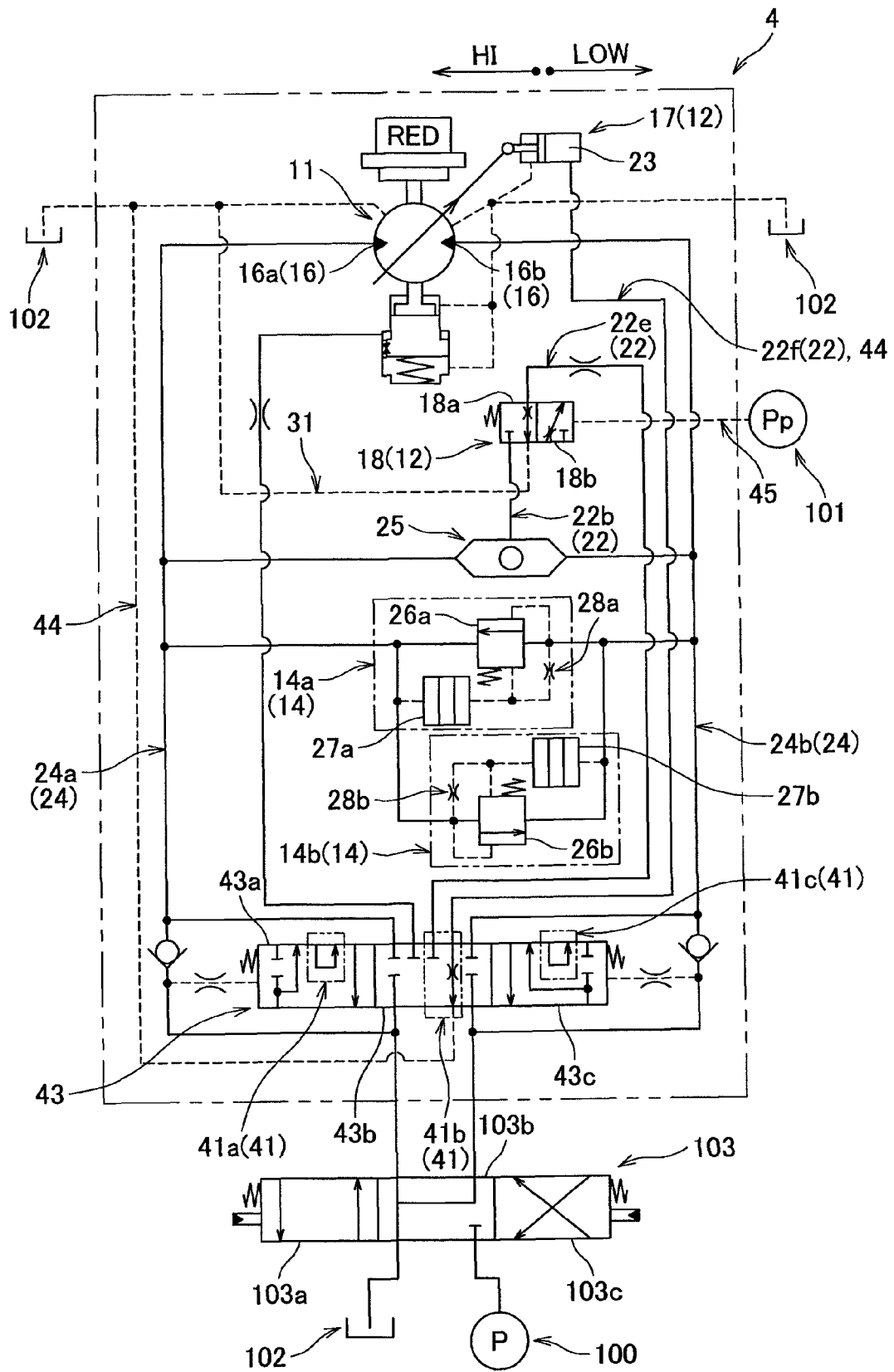
FIG. 5 A hydraulic circuit diagram showing a variable hydraulic motor driving device according to a fourth embodiment of the present invention.

The followings describe a variable hydraulic motor driving device according to a fourth embodiment of the present invention. FIG. 5 is a hydraulic circuit diagram showing a variable hydraulic motor driving device 4 according to the fourth embodiment. The variable hydraulic motor driving device 4 shown in FIG. 5 is mounted in a not-shown construction vehicle, as same as the variable hydraulic motor driving device 1 of the first embodiment. The variable hydraulic motor driving device 4 is connected to a pump 100, a pilot pump 102, and a tank 102, and is connected to the pump 100 and the tank 102 through a direction changeover valve 103.

The variable hydraulic motor driving device 4 includes a hydraulic motor 11, a speed changing mechanism 12, a braking purpose speed changing mechanism (the second braking purpose speed changing mechanism of the present invention) 41, relief valves 14, a counterbalance valve 43, a speed signal pilot passage 45, and the like in the same way as the first embodiment. However, the fourth embodiment is different from the first embodiment in the structures of the braking purpose speed changing mechanism 41, the counterbalance valve 43, the speed signal pilot passage 45, and supply passages 22, and the fourth embodiment is also different in that a drain passage 44 is provided through which a pressure chamber 23 of a tilt piston 17 communicates with the tank 102. In the description on the fourth embodiment, the same reference numeral is given to the same element as in the first embodiment, and description of the same element is omitted.

As shown in FIG. 5, in the variable hydraulic motor driving device 4, the speed signal pilot passage 45 which connects a pilot pump 101 with a pilot chamber of a high-low speed switching valve 18 is always open. In addition, the braking purpose speed changing mechanism 41 is provided as a fourth changeover valve of the present invention which is formed integrally with the counterbalance valve 43 (hereinafter, the braking purpose speed changing mechanism 41 is referred to as a fourth changeover valve 41 in this embodiment, since it represents the same element as the fourth changeover valve). The counterbalance valve 43 is configured to function similarly to the counterbalance valve 15 of the first embodiment (the changeover positions 15a and 15c, and the neutral position 15b of the counterbalance valve 15 respectively correspond to changeover positions 43a and 43c, and a neutral position 43b of the counterbalance valve 43). As described above, the counterbalance valve 43 is formed integrally with the fourth changeover valve 41.

The fourth changeover valve 41, which is the braking purpose speed changing mechanism 41, is a changeover valve which is shifted along with the shift of the counterbalance valve 43, and is provided as a changeover valve which switches the state of the drain passage 44 between an open state and a close state. That is, the fourth changeover valve 41 is formed in the counterbalance valve 43 so as to have: (i) an open position 41b for opening the drain passage 44 in response to a shift of the counterbalance valve 43 to the neutral position 43b; and (ii) close positions 41a and 41c for closing the drain passage 44 in response to a shift of the counterbalance valve 43 to the changeover position 43a or 43c. Further, among the supply passages 22, a supply passage 22e and a supply passage 22f, which communicate with each other through the fourth changeover valve 41, constitute a passage between the high-low speed switching valve 18 and the pressure chamber 23 of the tilt piston 17. Communication is established between the supply passages 22e and 22f when the shift of the counterbalance valve 43 to the changeover position 43a or 43c causes the fourth changeover valve 41 to be shifted to the close position 41a or 41c. On the other hand, communication between the supply passages 22e and 22f is closed when the shift of the counterbalance valve 43 to the neutral position 43b causes the fourth changeover valve 41 to be shifted to the open position 41b. Note that the supply passage 22f also functions as a part of the drain passage 44 (the supply passage 22f is shared between the supply passages 22 and the drain passage 44).

As described above, the braking purpose speed changing mechanism 41 is formed integrally with the counterbalance valve 43, and is formed as the fourth changeover valve 41 which has the close positions 41a and 41c and the open position 41b, to which positions the fourth changeover valve 41 can be shifted. When the shift of the direction changeover valve 103 to the changeover position 103a or 103c causes the counterbalance valve 43 to be shifted to the changeover position 43c or 43a with the result that the fourth changeover valve 41 is shifted to the close position 41c or 41a, the braking purpose speed changing mechanism 41 closes the drain passage 44 and establishes communication between the supply passages 22e and 22f. At this time, since the high-low speed switching valve 18 has already been shifted to the changeover position 18b in response to the reception of a speed signal, pressure oil is supplied to the pressure chamber 23 of the tilt piston 17 through the supply passages 22, and as a result, the hydraulic motor 11 is switched to a high-speed mode. On the other hand, when the shift of the direction changeover valve 103 to the neutral position 103b causes the counterbalance valve 43 to be shifted to the neutral position 43b with the result that the fourth changeover valve 41 is shifted to the open position 41b, the braking purpose speed changing mechanism 41 opens the drain passage 44 and closes communication between the supply passages 22e and 22f. This allows the pressure chamber 23 of the tilt piston 17 to communicate with the tank 102 through the drain passage 44, so that pressure oil in the pressure chamber 32 is discharged to the tank 102. Thus, the variable hydraulic motor driving device 4 operates so as to discharge pressure oil from the pressure chamber 23 of the tilt piston 17 in response to a shift of the counterbalance valve 43 to the neutral position 43b, and as a result, the hydraulic motor 11 is switched to a low-speed mode.

According to the variable hydraulic motor driving device 4 of the fourth embodiment, when the counterbalance valve 43 is shifted to the neutral position 43b, the braking purpose speed changing mechanism 41 operates to discharge pressure oil from the pressure chamber 23 of the tilt piston 17. Therefore, when stoppage operation is started during high-speed travel, the counterbalance valve 43 is shifted to the neutral position 43b, and as a result, the hydraulic motor 11 is switched from the high-speed mode to the low-speed mode. Therefore, in the same way as the first embodiment, at an early stage of the braking operation, the hydraulic motor is in a transition state between the high-speed mode and the low-speed mode. This restrains a large braking force from being generated from the early stage of the braking operation. In addition, since brake torque increases continuously as the mode transits from the high-speed mode to the low-speed mode during the braking operation, it is possible to prevent braking operation from being excessively long, unlike the case where the high-speed mode is maintained. Therefore, according to the variable hydraulic motor driving device 4, similar advantageous effects to those of the first embodiment can be obtained. That is, it is possible to prevent braking operation from being excessively long, and also to prevent a large shock from occurring at a time of stoppage due to a large braking force generated from the early stage of braking operation.

In addition, according to the variable hydraulic motor driving device 4, the fourth changeover valve 41, which opens the drain passage 44 in response to a shift of the counterbalance valve 43 to the neutral position 43b so that pressure oil is discharged from the pressure chamber 23 of the tilt piston 17, is formed integrally with the counterbalance valve 43. Therefore, it is possible to restrain the increase in the number of components.

The embodiments of the present invention have been described as above, however, the invention is not limited to these embodiments and various modifications are possible within a scope of the claims.

The invention claimed is:

1. A variable hydraulic motor driving device, comprising:
a hydraulic motor which is switched, by varying motor displacement, between a low-speed mode in which the motor rotates at low speed and a high-speed mode in which the motor rotates at high speed;
a speed changing mechanism including a tilt piston which varies the motor displacement of the hydraulic motor, and a high-low speed switching valve which switches a state of a supply passage between an open state and a close state, the supply passage supplying pressure oil to a pressure chamber of the tilt piston;
a speed signal pilot passage through which a speed signal is transmitted, in a form of a pilot pressure, to the high-low speed switching valve;
a supply port and a discharge port of the hydraulic motor, the supply port and the discharge port communicating with a direction changeover valve which controls supply/discharge of pressure oil;
a counterbalance valve disposed between the hydraulic motor and the direction changeover valve; and
a relief valve which communicates with the supply port and the discharge port, and has a set pressure corresponding to the low-speed mode,
wherein the hydraulic motor is switched to the high-speed mode when pressure oil is supplied to the pressure chamber of the tilt piston based on the transmission of the speed signal to the high-low speed switching valve, and the hydraulic motor is switched to the low-speed mode when pressure oil is discharged from the pressure chamber of the tilt piston, the variable hydraulic motor driving device further comprising a first braking purpose speed changing mechanism which operates so as to discharge pressure oil from the pressure chamber of the tilt piston when a pressure of pressure oil between the counterbalance valve and the direction changeover valve becomes equal to a tank pressure, the first braking purpose speed changing mechanism being provided in the variable hydraulic motor driving device.

2. The variable hydraulic motor driving device according to claim 1, wherein:
the first braking purpose speed changing mechanism has a first changeover valve which switches a state of the speed signal pilot passage between an open state and a close state, and a first changeover valve passage which connects a part between the counterbalance valve and the direction changeover valve with a pilot chamber of the first changeover valve; and
the first changeover valve switches the state of the speed signal pilot passage from the open state to the close state when the pressure of pressure oil between the counterbalance valve and the direction changeover valve becomes equal to the tank pressure.

3. A variable hydraulic motor driving device, comprising:
a hydraulic motor which is switched, by varying motor displacement, between a low-speed mode in which the motor rotates at low speed and a high-speed mode in which the motor rotates at high speed;
a speed changing mechanism including a tilt piston which varies the motor displacement of the hydraulic motor, and a high-low speed switching valve which switches a state of a supply passage between an open state and a close state, the supply passage supplying pressure oil to a pressure chamber of the tilt piston;
a speed signal pilot passage through which a speed signal is transmitted, in a form of a pilot pressure, to the high-low speed switching valve;
a supply port and a discharge port of the hydraulic motor, the supply port and the discharge port communicating with a direction changeover valve which controls supply/discharge of pressure oil;
a counterbalance valve disposed between the hydraulic motor and the direction changeover valve; and
a relief valve which communicates with the supply port and the discharge port, and has a set pressure corresponding to the low-speed mode,
wherein the hydraulic motor is switched to the high-speed mode when pressure oil is supplied to the pressure chamber of the tilt piston based on the transmission of the speed signal to the high-low speed switching valve, and the hydraulic motor is switched to the low-speed mode when pressure oil is discharged from the pressure chamber of the tilt piston, the variable hydraulic motor driving device further comprising a first braking purpose speed changing mechanism which operates so as to discharge pressure oil from the pressure chamber of the tilt piston when a pressure of pressure oil between the counterbalance valve and the direction changeover valve becomes equal to a tank pressure, the first braking purpose speed changing mechanism being provided in the variable hydraulic motor driving device, wherein:
the first braking purpose speed changing mechanism has: a second changeover valve which switches a state of a drain passage between an open state and a close state, through which passage the pressure chamber of the tilt piston communicates with a tank;
a second changeover valve passage which connects a part between the counterbalance valve and the direction changeover valve with a pilot chamber of the second changeover valve; and
the second changeover valve switches the state of the drain passage from the close state to the open state when the pressure of pressure oil between the counterbalance valve and the direction changeover valve becomes equal to the tank pressure.

4. A variable hydraulic motor driving device, comprising:
a hydraulic motor which is switched, by varying motor displacement, between a low-speed mode in which the motor rotates at low speed and a high-speed mode in which the motor rotates at high speed;
a speed changing mechanism including a tilt piston which varies the motor displacement of the hydraulic motor, and a high-low speed switching valve which switches a state of a supply passage between an open state and a close state, the supply passage supplying pressure oil to a pressure chamber of the tilt piston;
a speed signal pilot passage through which a speed signal is transmitted, in a form of a pilot pressure, to the high-low speed switching valve;
a supply port and a discharge port of the hydraulic motor, the supply port and the discharge port communicating with a direction changeover valve which controls supply/discharge of pressure oil;
a counterbalance valve disposed between the hydraulic motor and the direction changeover valve; and
a relief valve which communicates with the supply port and the discharge port, and has a set pressure corresponding to the low-speed mode,
wherein the hydraulic motor is switched to the high-speed mode when pressure oil is supplied to the pressure chamber of the tilt piston based on the transmission of the speed signal to the high-low speed switching valve, and the hydraulic motor is switched to the low-speed mode when pressure oil is discharged from the pressure chamber of the tilt piston, the variable hydraulic motor driving device further comprising a second braking purpose speed changing mechanism which operates so as to discharge pressure oil from the pressure chamber of the tilt piston in response to a shift of the counterbalance valve to a neutral position, the second braking purpose speed changing mechanism being formed integrally with the counterbalance valve.

5. The variable hydraulic motor driving device according to claim 4, wherein:
the second braking purpose speed changing mechanism has a third changeover valve which switches a state of the speed signal pilot passage between an open state and a close state; and
the third changeover valve is formed integrally with the counterbalance valve, and is configured so as to close the speed signal pilot passage in response to a shift of the counterbalance valve to the neutral position and so as to open the speed signal pilot passage in response to a shift of the counterbalance valve to a changeover position.

6. The variable hydraulic motor driving device according to claim 4, wherein:
the second braking purpose speed changing mechanism has a fourth changeover valve which switches a state of a drain passage between an open state and a close state, through which passage the pressure chamber of the tilt piston communicates with a tank; and
the fourth changeover valve is formed integrally with the counterbalance valve, and is configured so as to open the drain passage in response to a shift of the counterbalance valve to the neutral position and so as to close the drain passage in response to a shift of the counterbalance valve to a changeover position.

* * * * *